United States Patent
Kozel et al.

(10) Patent No.: US 11,682,885 B2
(45) Date of Patent: Jun. 20, 2023

(54) SWITCHGEAR

(71) Applicant: ABB Schweiz AG, Baden (CH)

(72) Inventors: Tomas Kozel, Brno (CZ); Radek Javora, Hrusovany u Brna (CZ); Josef Cernohous, Jamne nad Orlici (CZ); Christoph Budde, Heidelberg (DE); Christian Simonidis, Karlsruhe (DE)

(73) Assignee: ABB Schweiz AG, Baden (CH)

( * ) Notice: Subject to any disclaimer, the term of this patent is extended or adjusted under 35 U.S.C. 154(b) by 153 days.

(21) Appl. No.: 17/344,975

(22) Filed: Jun. 11, 2021

(65) Prior Publication Data
US 2021/0305788 A1  Sep. 30, 2021

Related U.S. Application Data

(63) Continuation of application No. PCT/EP2019/084661, filed on Dec. 11, 2019.

(30) Foreign Application Priority Data

Dec. 19, 2018 (EP) ................................. 18214170

(51) Int. Cl.
*H02B 3/00* (2006.01)
*H02B 1/26* (2006.01)
(Continued)

(52) U.S. Cl.
CPC ............... *H02B 3/00* (2013.01); *H01H 9/54* (2013.01); *H02B 1/26* (2013.01); *H02B 7/06* (2013.01)

(58) Field of Classification Search
CPC ... H02B 3/00; H02B 1/26; H02B 7/06; H02B 13/02–025; H01H 9/54
See application file for complete search history.

(56) References Cited

U.S. PATENT DOCUMENTS

| 6,518,531 B2* | 2/2003 | Arioka | H02B 13/035 |
| | | | 218/120 |
| 7,186,942 B1* | 3/2007 | Slade | H01H 33/127 |
| | | | 218/120 |

(Continued)

FOREIGN PATENT DOCUMENTS

| CN | 101946379 A | 1/2011 |
| CN | 103996990 A | 8/2014 |

(Continued)

OTHER PUBLICATIONS

European Patent Office, Office Action in European Patent Application No. 18214170.5, 11 pp. (dated Feb. 20, 2023).

*Primary Examiner* — Robert J Hoffberg
(74) *Attorney, Agent, or Firm* — Leydig, Voit & Mayer, Ltd.

(57) ABSTRACT

A switchgear or control gear includes: a first compartment; at least one removable module; a plurality of main switchgear or control gear components; and a plurality of auxiliary switchgear or control gear components. The plurality of main switchgear or control gear components are sub-divided into a first group of components that have a lifetime greater than a threshold level and a second group of components that have a lifetime less than or equal to the threshold level. The plurality of auxiliary switchgear or control gear components are sub-divided into a first group of components that have a lifetime greater than the threshold level and a second group of components that have a lifetime less than or equal to the threshold level.

16 Claims, 2 Drawing Sheets

(51) Int. Cl.
    *H01H 9/54*    (2006.01)
    *H02B 7/06*    (2006.01)

(56) References Cited

U.S. PATENT DOCUMENTS

| | | | | |
|---|---|---|---|---|
| 7,417,846 B2 * | 8/2008 | Arioka | ................ | H02B 13/035 |
| | | | | 361/612 |
| 7,612,988 B2 * | 11/2009 | Ulinskas | ................ | H01H 71/74 |
| | | | | 361/605 |
| 7,829,814 B2 * | 11/2010 | Marchand | .......... | H01H 33/6661 |
| | | | | 218/140 |
| 8,717,742 B2 * | 5/2014 | Kim | .................... | H02B 13/035 |
| | | | | 361/620 |
| 11,095,099 B2 * | 8/2021 | Abe | .................... | H02B 13/035 |
| 11,139,642 B2 * | 10/2021 | Kozel | .................... | H02B 11/20 |
| 11,342,140 B2 * | 5/2022 | Gentsch | ................ | H01H 31/32 |
| 11,349,282 B2 * | 5/2022 | Park | .................... | H02B 11/127 |
| 2013/0050905 A1 * | 2/2013 | Kim | .................... | H02B 13/045 |
| | | | | 361/608 |
| 2017/0085064 A1 | 3/2017 | Cassimere et al. | | |
| 2021/0183603 A1 * | 6/2021 | Javora | ................ | H01H 71/1009 |
| 2021/0313781 A1 * | 10/2021 | Cernohous | .......... | H02B 13/0352 |

FOREIGN PATENT DOCUMENTS

| | | | | |
|---|---|---|---|---|
| CN | 105896321 A | 8/2016 | | |
| CN | 207459518 U | 6/2018 | | |
| CN | 207801205 U | 8/2018 | | |
| DE | 19857170 A1 * | 6/2000 | ........... | H01H 33/666 |
| EP | 1463173 A1 * | 9/2004 | ......... | H02B 13/0356 |
| EP | 2953219 A1 | 12/2015 | | |
| EP | 3754801 A1 * | 12/2020 | ............... | H02B 1/56 |
| WO | WO 01/18939 A2 | 3/2001 | | |
| WO | WO 2009101713 A1 | 8/2009 | | |

* cited by examiner

Removable box with disconnector drive and auxiliaries

Either just drive and auxiliaries

Or including moving contact

SWITCHGEAR

CROSS-REFERENCE TO PRIOR APPLICATIONS

This application is a continuation of International Patent Application No. PCT/EP2019/084661, filed on Dec. 11, 2019, which claims priority to European Patent Application No. 18 214 170.5, filed on Dec. 19, 2018. The entire disclosure of both applications is hereby incorporated by reference herein.

FIELD

The present invention relates to switchgear or control gear for low voltage, medium voltage or high voltage use with a substation.

BACKGROUND

In state-of-art switchgear and control gear (also called controlgear) designs all the components are placed in one enclosure. Maintenance can be problematic, as more and more electronics and subtle mechanisms are used for control, interlocking and monitoring functions within the power distribution compartments. The service continuity of the switchgear or controlgear or its part is thus compromised in case, for example a specific component such as an auxiliary device requires maintenance.

Autonomous substations or switchgear/control gear (or controlgear) systems have been proposed, and require a robotic system for the whole substation in order to achieve a required level of autonomy.

US 2017/0085064 A1 describes local equipment room (LER) for use in an industrial facility, having one or more robots to perform certain tasks.

Such robotic systems operate with the substation or switchgear or control gear and perform both monitoring and maintenance tasks. Such robotic system can be quite complex and expensive, especially when considering variability existing in substations today. Even though robotic system can reduce maintenance tasks in a substation with respect to switchgear or control gear, the robot itself may require considerable maintenance.

There is a need to address these issues.

SUMMARY

In an embodiment, the present invention provides a switchgear or control gear, comprising: a first compartment; at least one removable module; a plurality of main switchgear or control gear components; and a plurality of auxiliary switchgear or control gear components, wherein the plurality of main switchgear or control gear components are sub-divided into a first group of components that have a lifetime greater than a threshold level and a second group of components that have a lifetime less than or equal to the threshold level, wherein the plurality of auxiliary switchgear or control gear components are sub-divided into a first group of components that have a lifetime greater than the threshold level and a second group of components that have a lifetime less than or equal to the threshold level, wherein the plurality of main switchgear or control gear components in the first group of components and the plurality of auxiliary switchgear or control gear in the first group of components are housed in the first compartment, wherein the plurality of main switchgear or control gear components in the second group of components and the plurality of auxiliary switchgear or control gear in the second group of components are housed in or associated with the at least one removable module, and wherein removal of the at least one removable module from the switchgear or control gear is configured to remove the plurality of main switchgear or control gear components in the second group of components and the plurality of auxiliary switchgear or control gear in the second group of components from the switchgear or control gear.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
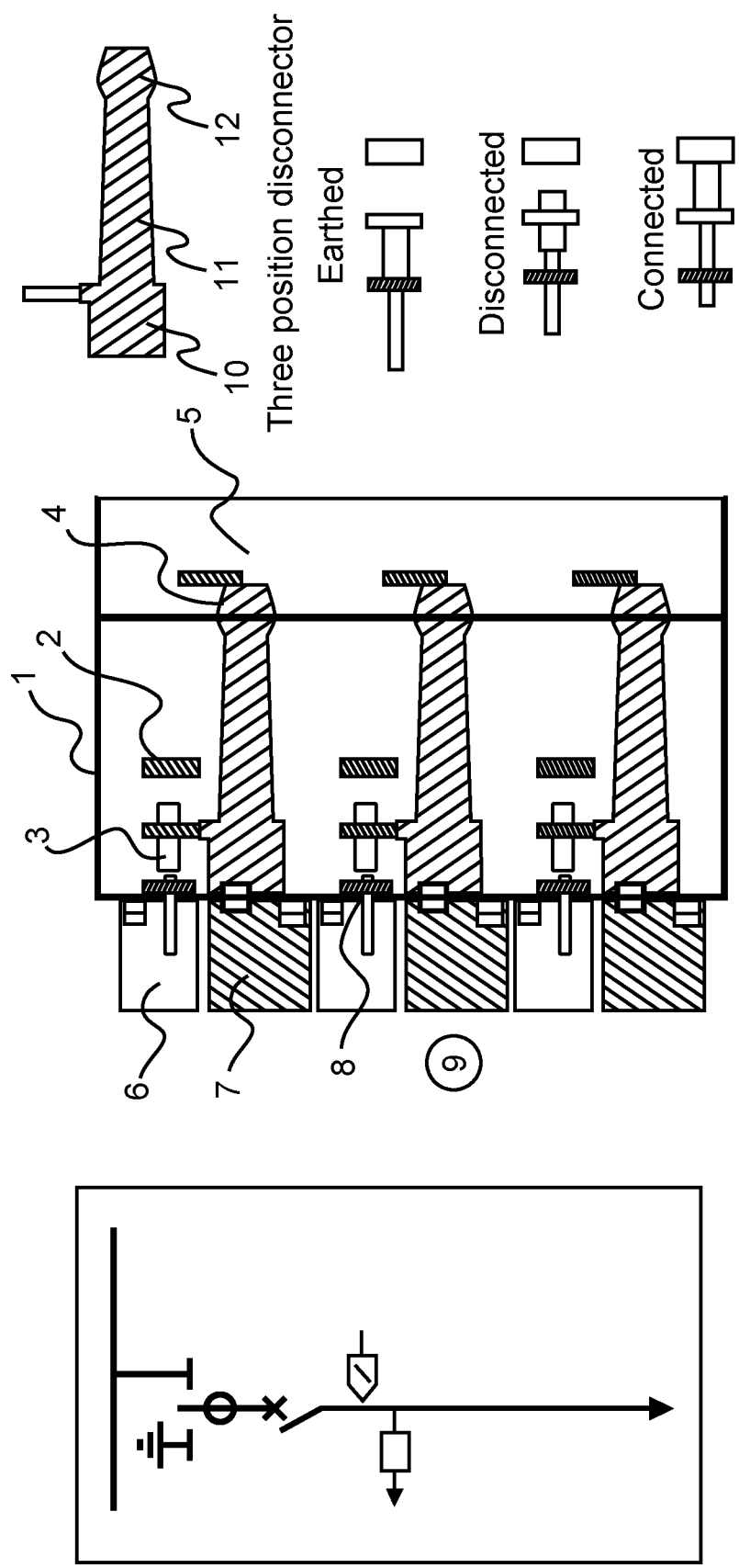
FIG. 1 shows an example of a switchgear or control gear.

In an embodiment, the present invention provides means to more easily perform maintenance tasks for a switchgear or control gear.

In a first aspect, there is provided a switchgear or control gear, comprising:
  a first compartment;
  at least one removable module;
  a plurality of main switchgear or control gear components; and
  a plurality of auxiliary switchgear or control gear components.

The plurality of main switchgear or control gear components are sub-divided into a first group of components that have a lifetime greater than a threshold level and a second group of components that have a lifetime less than or equal to the threshold level. The plurality of auxiliary switchgear or control gear components are sub-divided into a first group of components that have a lifetime greater than the threshold level and a second group of components that have a lifetime less than or equal to the threshold level. The plurality of main switchgear or control gear components in the first group of components and the plurality of auxiliary switchgear or control gear in the first group of components are housed in the first compartment. The plurality of main switchgear or control gear components in the second group of components and the plurality of auxiliary switchgear or control gear in the second group of components are housed in or associated with the at least one removable module. Removal of the at least one removable module from the switchgear or control gear is configured to remove the plurality of main switchgear or control gear components in the second group of components and the plurality of auxiliary switchgear or control gear in the second group of components from the switchgear or control gear.

The plurality of main switchgear or control gear components in the second group of components and the plurality of auxiliary switchgear or control gear in the second group of components being housed or associated with the removable module does not necessarily mean that these components are totally enclosed within the removable module. But, being housed or associated with the removable module means that removal of the removable module from the switchgear or control gear also removes those components that are housed or associated with the removable module from the switchgear or control gear.

The terms "have a lifetime greater than a threshold" and "have a lifetime less than or equal to a threshold" here relate to an expected lifetime, that can be determined from prior experimental knowledge of components or from data sheets for example.

In an example, the plurality of main switchgear or control gear components in the first group of components are fixedly housed in the first compartment.

In an example, the plurality of auxiliary switchgear or control gear in the first group of components are fixedly housed in the first compartment.

In an example, the plurality of main switchgear or control gear components in the second group of components and the plurality of auxiliary switchgear or control gear in the second group of components are divided into a plurality of logical groups, and wherein the components in a logical group are housed in or associated with the same removable module.

In an example, a disconnector switch drive and auxiliaries are housed in or associated with the same removable module.

In an example, the disconnector switch is a linear movement type switch or a rotational movement type switch.

In an example, a circuit breaker control electronics and auxiliaries are located in the same removable module.

In an example, the disconnector switch drive and auxiliaries are housed in or associated with a different removable module to the removable module within which the circuit breaker control electronics and auxiliaries are housed or associated.

In an example, the removable module within which is housed or associated the circuit breaker control electronics and auxiliaries also houses or is associated with at least one part of a circuit breaker drive. An interface to a circuit breaker pole comprises a removable mechanical or electrical connection configured to transfer mechanical energy from the circuit breaker drive to a circuit breaker moving contact or electrical energy from the supply source to the circuit breaker drive.

In an example, a circuit breaker single pole unit is housed in or associated with the removable module. The circuit breaker single pole unit utilizes a rotational circuit breaker pole. A vacuum interrupter is located in a central axis of the pole around the central axis is configured to act as a three position disconnector switch for connection, disconnection, and earthing.

In an example, each phase of three phases has a same logical group, and the logical group for each phase is housed in or associated with a different removable module.

In an example, each phase of three phases has a same logical group, and the logical group for each phase is housed in or associated with the same removable module.

In an example, the first compartment is arc proof.

In an example, each removable module of the at least one removable module comprises a plug and socket connection to supply and signal collection circuits, configured to enable communication with at least one component external to the removable module.

In an example, for at least one specific component of the components of the plurality of main switchgear or control gear components in the second group of components or the plurality of auxiliary switchgear or control gear in the second group of components, the at least one removable module comprises at least one plug and socket connection.

In an example, a plug and socket connection of the at least one plug and socket connection is configured for electrical connection between a circuit breaker drive electronics and a circuit breaker drive.

In an example, the switchgear or control gear comprises at least one cable connection compartment within which is housed or associated at least part of at least one cable connection for at least one vacuum interrupter housed in the first compartment.

In an example, at least one bushing forms part of the connection between the at least one cable connection and the at least one vacuum interrupter, and wherein the at least one bushing comprises current and voltage sensors.

In an example, the at least one cable connection compartment comprises at least one door or removable wall section.

In an example, a segregating wall between the first compartment and the at least one cable connection compartment is an arc proof segregation, enabling access of a user to the cable connection compartment when at least one component in the first compartment is operational.

In an example, a different cable connection compartment is provided for each phase of three phases for a three phase system.

In an example, the plurality of main switchgear or control gear components in the first group of components and the plurality of auxiliary switchgear or control gear in the first group of components comprises one or more of: copper bars of a primary circuit; a circuit breaker CB pole; a vacuum interrupter; post insulators; current and voltage sensors; and disconnector fixed contacts.

In an example, the plurality of main switchgear or control gear components in the second group of components and the plurality of auxiliary switchgear or control gear in the second group of components comprises one or more of: electronic components for control and feedback collection; disconnector switch drive; circuit breaker control electronics; auxiliary switches; sensors for condition monitoring; cable terminations, and plug and socket systems.

In an example, a primary circuit of the switchgear or control gear comprises one or more of: an earthing switch, voltage indication, surge arrestor, Ultra Fast Earthing Switch (UFES), IS-limiter (as invented by ABB Calor Emag in 1955), contactor, load-break switch, and fuse, and these components (and/or subcomponents of these components) when present are comprised within the second group of components of the plurality of main switchgear or control gear components or comprised within the second group of components of the plurality of auxiliary switchgear or control gear components.

In an example, the removable module is configured to be removed from the switchgear and replaced with a different removable module of the same type.

Figure 2:
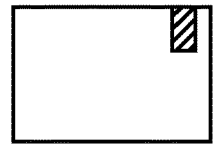
FIG. 2 shows an example of a removable module or box for a switchgear or control gear.
Figure 2:
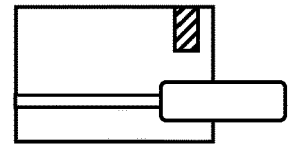

FIGS. 1-2 show examples of a switchgear or control gear for operation in a low voltage, medium voltage or high voltage substation, and where the switchgear or control gear has one or more removable modules or boxes.

One example relates to a switchgear or control gear. The switchgear or control gear (also known as controlgear) comprises a first compartment 1, at least one removable module 6, 7, a plurality of main switchgear or control gear components, and a plurality of auxiliary switchgear or control gear components. The plurality of main switchgear or control gear components are sub-divided into a first group of components that have a lifetime greater than a threshold level and a second group of components that have a lifetime less than or equal to the threshold level. The plurality of auxiliary switchgear or control gear components are subdivided into a first group of components that have a lifetime greater than the threshold level and a second group of components that have a lifetime less than or equal to the threshold level. The plurality of main switchgear or control gear components in the first group of components and the plurality of auxiliary switchgear or control gear in the first group of components are housed in the first compartment. The plurality of main switchgear or control gear components in the second group of components and the plurality of auxiliary switchgear or control gear in the second group of components are housed in or associated with the at least one removable module. Removal of the at least one removable module from the switchgear or control gear is configured to remove the plurality of main switchgear or control gear components in the second group of components and the plurality of auxiliary switchgear or control gear in the second group of components from the switchgear or control gear. Thus, removal of the removable module allows or enables these components also to be removed from the switchgear of control gear.

The threshold for the main switchgear or control gear components can be the same as the threshold for the auxiliary switchgear or control gear components. The threshold can be determined in a number of different ways, for example being an average lifetime of components in the switchgear or control gear, or a time span equal to that between major scheduled system maintenance for example. Other time thresholds can be utilized.

According to an example, the plurality of main switchgear or control gear components in the first group of components are fixedly housed in the first compartment.

According to an example, the plurality of auxiliary switchgear or control gear in the first group of components are fixedly housed in the first compartment.

According to an example, the plurality of main switchgear or control gear components in the second group of components and the plurality of auxiliary switchgear or control gear in the second group of components are divided into a plurality of logical groups, and wherein the components in a logical group are housed in or associated with the same removable module.

According to an example, a disconnector switch drive and auxiliaries are housed in or associated with the same removable module 6.

According to an example, the disconnector switch is a linear movement type switch or a rotational movement type switch.

According to an example, a circuit breaker control electronics and auxiliaries are located in the same removable module 7.

According to an example, the disconnector switch drive and auxiliaries are housed in or associated with a different removable module to the removable module within which the circuit breaker control electronics and auxiliaries are housed or associated.

According to an example, the removable module within which is housed or associated the circuit breaker control electronics and auxiliaries also houses or is associated with at least one part of a circuit breaker drive 10. An interface to a circuit breaker pole 4 comprises a removable mechanical or electrical connection configured to transfer mechanical energy from the circuit breaker drive to a circuit breaker moving contact or electrical energy from the supply source to the circuit breaker drive.

In an example an electromagnetic drive is provided, which is fixedly coupled to the circuit breaker pole. The coil windings of this drive then fall into the "First group of components". The energy storage capacitor and the drive control electronics then fall into the "second group of components". Thus an electrical interface is sufficient, through for example a plug in the cable from the drive controller to the motor as part of a plug and socket functionality.

According to an example, a circuit breaker single pole unit is housed in or associated with the removable module. The circuit breaker single pole unit utilizes a rotational circuit breaker pole. A vacuum interrupter located in a central axis of the pole serves as the main current switching device while rotation of the pole around the central axis is configured to act as a three position disconnector switch for connection, disconnection, and earthing.

According to an example, each phase of three phases has a same logical group. The logical group for each phase is housed in or associated with a different removable module.

According to an example, each phase of three phases has a same logical group, and wherein the logical group for each phase is housed in or associated with the same removable module.

According to an example, the first compartment is arc proof.

According to an example, each removable module of the at least one removable module comprises a plug and socket connection to supply and signal collection circuits, configured to enable communication with at least one component external to the removable module.

According to an example, for at least one specific component of the components of the plurality of main switchgear or control gear components in the second group of components or the plurality of auxiliary switchgear or control gear in the second group of components, the at least one removable module comprises at least one plug and socket connection.

According to an example, a plug and socket connection of the at least one plug and socket connection is configured for electrical connection between a circuit breaker drive electronics and a circuit breaker drive 10.

According to an example, the switchgear or control gear comprises at least one cable connection compartment 5 within which is housed or associated at least part of at least one cable connection for at least one vacuum interrupter 11 housed in the first compartment.

According to an example, at least one bushing 12 forms part of the connection between the at least one cable connection and the at least one vacuum interrupter, and the at least one bushing comprises current and voltage sensors.

According to an example, the at least one cable connection compartment comprises at least one door or removable wall section.

According to an example, a segregating wall between the first compartment and the at least one cable connection compartment is an arc proof segregation, enabling access of a user to the cable connection compartment when at least one component in the first compartment is operational.

According to an example, a different cable connection compartment is provided for each phase of three phases for a three phase system.

According to an example, the plurality of main switchgear or control gear components in the first group of components and the plurality of auxiliary switchgear or control gear in the first group of components comprises one or more of: copper bars of a primary circuit; a circuit breaker CB pole;

a vacuum interrupter; post insulators; current and voltage sensors; and disconnector fixed contacts.

According to an example, the plurality of main switchgear or control gear components in the second group of components and the plurality of auxiliary switchgear or control gear in the second group of components comprises one or more of: electronic components for control and feedback collection; disconnector switch drive; circuit breaker control electronics; auxiliary switches; sensors for condition monitoring; cable terminations, and plug and socket systems.

According to an example, a primary circuit of the switchgear or control gear comprises, in other words can include, one or more of: an earthing switch, voltage indication, surge arrestor, UFES, IS-limitor, contactor, load-break switch, and fuse, and these components (and/or subcomponents of these components) when present are comprised within the second group of components of the plurality of main switchgear or control gear components or comprised within the second group of components of the plurality of auxiliary switchgear or control gear components.

According to an example, the removable module is configured to be removed from the switchgear and replaced with a different removable module of the same type.

Thus, a new substation development is provided where the less reliable parts are separated from the more reliable parts and grouped in one or more replaceable modules for simplifying or automating the maintenance, while increasing the switchgear up-time. The modularization and segregation of the less reliable parts can facilitate the maintenance in both the human operated and maintained switchgear and controlgear designs as well as switchgears and controlgears with unmanned operation and maintenance designs. Thus, a non-robotic solution for a maintenance of internal parts of substation is provided.

Continuing with the figures, specific features are now described. In the examples, as discussed above the parts needing more regular maintenance are encapsulated to removable modules outside of the substation inner room and the robotic system or manipulator is operating outside the inner room. The arc proof enclosure of the switchgear or controlgear main functional parts serves as the inner room borders and as a safety barrier, allowing access for maintenance tasks on the switchgear removable modules or robotic system for human personnel with the switchgear in operation.

FIG. 1 shows a detailed example of a switchgear or control gear, where for ease of reference the following features shown are listed:

1. Arc proof enclosure;
2. Main busbar system;
3. Three position disconnector switch;
4. Circuit breaker single pole+electromagnetic drive coil+current and voltage sensors;
5. Human operator accessible cable connection box—with removable cover and/or doors;
6. Removable module or box with disconnector drive and auxiliaries with plug and socket connection to power source and station communication bus;
7. Removable module or box with circuit breaker control electronics and auxiliaries with plug and socket connection to the circuit breaker drive and auxiliaries and with plug and socket connection to power source and station communication bus;
8. Earthing copper;
9. Automatic maintenance system or human maintainer access side;
10. Circuit breaker drive;
11. Vacuum interrupter; and
12. Bushing providing sealing to cable compartment including current and voltage sensors.

Continuing with FIG. 1 the main and auxiliary components of a switchgear or controlgear has been divided into two groups:

1. the components that show high reliability and thus do not require preventive maintenance (and only exceptionally require corrective maintenance) in the expected lifetime of the switchgear or controlgear (typically the copper bars of primary circuit, the CB pole and vacuum interrupter, the post insulators, the current and voltage sensors, the disconnector fixed contacts)

2. the components that are less reliable or have shorter lifetime than expected lifetime of the switchgear or controlgear (typically all the electronic components for control and feedback collection, auxiliary switches, sensors for condition monitoring, cable terminations and plug and socket systems).

The parts belonging to the first group can be designed as fixed (i.e. removable only with extra effort, tools or preparation) and not easily accessible for the maintenance systems or personnel—protected by the enclosure. The enclosure of the parts from the first group can be arc proof as it contains most of the primary circuit current carrying and insulating parts. But it does not have to be arc proof.

The components belonging to the second group can be further sub grouped to logical subassemblies and encapsulated into removable modules. For example, disconnector switch drive and auxiliaries can be enclosed into one module, while circuit breaker (CB) control electronics and auxiliaries can be enclosed into another module. This is shown in the detailed example of FIG. 1.

Each of these removable modules has a plug and socket connection to the supply and signal collection circuits allowing communication with the rest of the switchgear.

If electrical connection to the component associated with the removable module is needed, a plug and socket connection to this component can be provided as well (for example electrical connection between the CB control electronics and the CB drive).

The first step of any maintenance action on the parts from second group is by replacing the module with parts that require maintenance with a spare module of the same type. The switchgear then can stay in operation or the down-time of the affected part of the switchgear can be limited to a minimum. Meanwhile the maintenance action itself on the parts in the replaced module can be postponed to a most suitable time and does not have to be carried out urgently.

The components from the second group that cannot be easily encapsulated to the removable module and equipped with the plug and socket system (for example power cable terminations) are located in a separate compartment. This compartment shall be preferably segregated with arc proof segregation from the inner room of the switchgear, and is separate for each feeder circuit and is accessible for human operators or maintainers. When all covers are properly closed this compartment is preferably arc proof and enclosed against the inner room of the switchgear as well as the outer space.

As shown in FIG. 1, the removable modules for the disconnector switch and the circuit breaker can be designed for each phase separately. These modules can however be designed as one module for all three phases.

As shown in FIG. 1, a separate removable module is provided for the disconnector switch and for the circuit breaker. These modules can however be designed as one module for both the devices.

In FIG. 1 the phases are arranged one above the other—the CB pole orientation being horizontal for all phases. The phases can be arranged in other geometries, for example poles of all phases oriented vertically or poles not being parallel and one pole oriented horizontally, with the second pole tilted 45 degrees from horizontal and the last pole vertical.

In FIG. 1 the CB poles include the current and voltage sensors. The sensors in a bushing can be a separate component connected to CB pole with a removable connection. Rather than having the sensors embedded into a bushing that is separate from the pole, the current and voltage sensors can be kept as stand alone devices located in the cable compartment and not integrated in the bushing.

The disconnector switch shown in FIG. 1 is a linear movement type. A disconnector switch with rotational movement can be used as well.

The removable module of the circuit breaker shown in FIG. 1 includes the control electronics and auxiliaries and allows simple electrical plug and socket connection to the circuit breaker drive. However, the module can also include parts of the CB drive and then the interface to the CB pole can be a removable mechanical connection transferring mechanical energy from the drive to the CB moving contact. The removable module can comprise the complete circuit breaker single pole unit (the pole including drive and auxiliaries). For that purpose it would be possible to use a rotational circuit breaker pole. The vacuum interrupter located in the central axis of the pole is then used for current interruption, while rotation of the pole around the central axis serves for connection, disconnection and earthing as three position disconnector switch.

It is to be noted that a removable cover of the cable termination compartment (shown on the right hand side of FIG. 1) can be replaced with doors.

The primary circuit of the switchgear or control gear can include other components and devices not described in FIG. 1, such as earthing switch, voltage indication, surge arrestors, UFES, IS-limiters, contactors, load-break switches, fuses. The concept of separation of less reliable or shorter lifetime parts is applied to these components in that case.

The removable module of the disconnector switch can embed the drive and auxiliaries only, or it can include the moving contact of the disconnector switch in as well. This is represented in FIG. 2.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A switchgear comprising:
a first compartment;
a plurality of removable modules;
a plurality of main switchgear components; and
a plurality of auxiliary switchgear components;
wherein the plurality of main switchgear components comprises a vacuum interrupter and a disconnector switch;
wherein the first compartment is arc proof;
wherein each of the removable modules comprises a plug and socket connection to supply and signal collection circuits, configured to enable communication with at least one component external to the same removeable module of the removable modules;
wherein the plurality of main switchgear components are sub-divided into a first group of components that have a lifetime greater than a threshold level and a second group of components that have a lifetime less than or equal to the threshold level;
wherein the plurality of auxiliary switchgear components are sub-divided into a third group of components that have a lifetime greater than the threshold level and a fourth group of components that have a lifetime less than or equal to the threshold level;
wherein the plurality of main switchgear components in the first group of components and/or the plurality of auxiliary switchgear in the third group of components include a first part of a circuit breaker drive;
wherein the plurality of main switchgear components in the first group of components and the plurality of auxiliary switchgear in the third group of components are fixedly housed in the first compartment;
wherein the plurality of main switchgear components in the second group of components and/or the plurality of auxiliary switchgear in the fourth group of components include a second part of the circuit breaker drive;
wherein the plurality of main switchgear components in the second group of components and the plurality of auxiliary switchgear components in the fourth group of components are housed in or associated with the plurality of removable modules;
wherein the plurality of main switchgear components in the second group of components and the plurality of auxiliary switchgear components in the fourth group of components are divided into a plurality of logical groups, wherein the components in a respective one of the logical groups are housed in or associated with the same removable module of the removable modules, wherein a disconnector switch drive and auxiliaries are housed in or associated with a first one of the removable modules, and wherein a circuit breaker control electronics and auxiliaries are housed in or associated with a second one of the removable modules, wherein the second part of the circuit breaker drive is also housed in the second one of the removable modules; and wherein removal of any of the plurality of removable modules from the switchgear is configured to remove at least a portion of the plurality of main switchgear components in the second group of components and/or the plurality of auxiliary switchgear in the fourth group of components from the switchgear.

2. The switchgear according to claim 1, wherein the disconnector switch comprises a linear movement type switch or a rotational movement type switch.

3. The switchgear according to claim 1, wherein an interface to a circuit breaker pole comprises a removable mechanical or electrical connection configured to transfer mechanical energy from the circuit breaker drive to a circuit breaker moving contact or electrical energy from the supply source to the circuit breaker drive.

4. The switchgear according to claim 3, wherein the circuit breaker pole comprises a rotational circuit breaker pole, wherein a circuit breaker single pole unit is housed in or associated with the second one of the removable modules, wherein the circuit breaker single pole unit utilizes the rotational circuit breaker pole, wherein the circuit breaker pole comprises the rotational circuit breaker pole, wherein the vacuum interrupter located in a central axis of the rotational circuit breaker pole serves as a main current switching device while rotation of the rotational circuit breaker pole around the central axis is configured to act as the disconnector switch, the disconnector switch having three positions for connection, disconnection, and earthing.

5. The switchgear according to claim 4, wherein each phase of three phases has a same one of the logical groups, and wherein the same one of the logical groups for each phase is housed in or associated with a different one of the removable modules.

6. The switchgear according to claim 4, wherein each phase of three phases has a same one of the logical groups, and wherein the same one of the logical groups for each phase is housed in or associated with the same one of the removable modules.

7. The switchgear according to claim 1, wherein a respective one of the plug and socket connection is configured for electrical connection between a circuit breaker drive electronics and the first part of the circuit breaker drive.

8. The switchgear according to claim 1, wherein the switchgear comprises at least one cable connection compartment within which is housed at least part of at least one cable connection for at least one vacuum interrupter housed in the first compartment, and wherein the at least one vacuum interrupter comprises the vacuum interrupter.

9. The switchgear according to claim 8, wherein at least one bushing forms part of the connection between the at least one cable connection and the at least one vacuum interrupter, and wherein the at least one bushing comprises current and voltage sensors.

10. The switchgear according to claim 8, wherein the at least one cable connection compartment comprises at least one door or removable wall section.

11. The switchgear according to claim 8, further comprising:
a segregating wall between the first compartment and the at least one cable connection compartment is an arc proof segregation, enabling access of a user to the cable connection compartment when at least one of the plurality of main switchgear components in the first group of components and/or the plurality of auxiliary switchgear components in the third group of components in the first compartment is operational.

12. The switchgear according to claim 8, wherein a different cable connection compartment is provided for each phase of three phases for a three phase system.

13. The switchgear according to claim 1, wherein the plurality of main switchgear components in the first group of components and/or the plurality of auxiliary switchgear components in the third group of components comprise one or more of:
copper bars of a primary circuit;
a circuit breaker (CB) pole;
the vacuum interrupter;
post insulators;
current and voltage sensors; and
disconnector fixed contacts.

14. The switchgear according to claim 1, wherein the plurality of main switchgear components in the second group of components and/or the plurality of auxiliary switchgear components in the fourth group of components comprise one or more of:
electronic components for control and feedback collection;
the disconnector switch drive;
the circuit breaker control electronics;
auxiliary switches;
sensors for condition monitoring;
cable terminations; and
the plug and socket systems connection.

15. The switchgear according to claim 1, wherein a primary circuit of the switchgear comprises one or more of:
an earthing switch;
a voltage indication;
a surge arrestor;
a UFES, IS-limiter;
a contactor;
a load-break switch; and
a fuse,
wherein these components when present are comprised within the second group of components of the plurality of main switchgear components or comprised within the fourth group of components of the plurality of auxiliary switchgear components.

16. The switchgear according to claim 1, wherein each of the removable modules is configured to be removed from the switchgear and replaced with a different one of the removable modules of a same type.

* * * * *